Jan. 8, 1963   M. E. SWANBERG   3,071,876
ELECTRONIC TRAINING APPARATUS
Filed Oct. 13, 1960   4 Sheets-Sheet 1
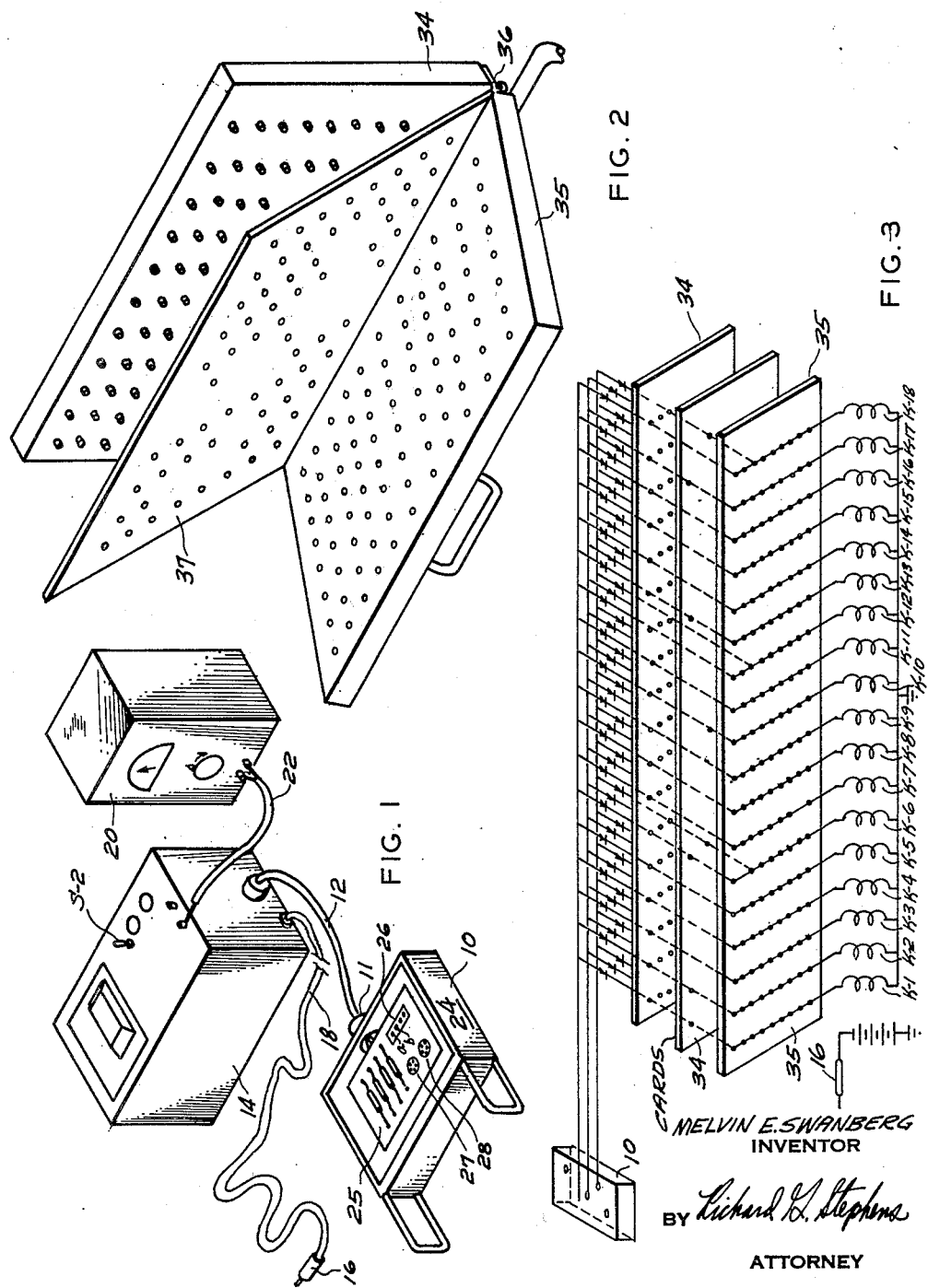

Jan. 8, 1963     M. E. SWANBERG     3,071,876
ELECTRONIC TRAINING APPARATUS
Filed Oct. 13, 1960     4 Sheets-Sheet 3

MELVIN E. SWANBERG
INVENTOR

BY Richard R. Stephens
ATTORNEY

United States Patent Office 3,071,876
Patented Jan. 8, 1963

3,071,876
ELECTRONIC TRAINING APPARATUS
Melvin E. Swanberg, Webster, N.Y., assignor to General Precision, Inc., Link Division, Binghamton, N.Y., a corporation of Delaware
Filed Oct. 13, 1960, Ser. No. 81,661
18 Claims. (Cl. 35—19)

My invention relates to improved apparatus useful for training persons effectively to "trouble shoot" or locate operational faults in complex electronic and electrical equipment, such as missile control systems, radars, computers, communications apparatus, and the like. The most common prior art methods of training persons to "trouble shoot" have involved the use of actual operating equipment, which has been intentionally modified by use of operationally defective components which do not differ in appearance from good components, so that trainees are forced to analyze system operation, and deduce and locate specific faults on the basis of voltage, current, resistance and frequency readings, waveforms, and similar measurements. The prior art methods have the disadvantages of (1) difficulty in changing the "malfunction," (2) high cost, due to the relatively high cost of actual operating equipment, (3) unreliability, because actual equipment is quite subject to undesired or unknown component failures in addition to intentional component failures, so that instruction in locating a particular given fault may be complicated by the unplanned presence of other faults, and (4) sometimes danger.

The present invention includes as a central concept the provision of a universal signal generator capable of providing various groups of voltages, resistances, waveforms, and/or other electrical quantities, to simulate those quantities which would be found at test points in the actual equipment, with the signals selectively programmed by selective switching means, including, for example, a punch card reader, thereby to present electrical quantities to terminal boards, test jacks, and other test points, for measurement and analysis by a trainee. A variety of punched cards may be prepared to teach maintenance of a given piece of electronic equipment. One card might program the signal generator so that the simulated "readings" obtained from a simulated amplifier unit simulate those which would be obtained from an actual unit having, for example, a burned-out interstage coupling transformer, while a second card might simulate a shorted cathode by-pass capacitor, etc., and even cards which provide all "correct" or "proper operations" readings may be provided. The invention also has the advantage that the results of certain component or system failures may be exaggerated or minimized and otherwise controlled, which is highly useful for teaching efficient electronic trouble shooting.

Apparatus constructed in accordance with the present invention may consist of mock-ups made principally of wood, sheet metal, cardboard and other inexpensive materials, together with actual simulated terminal strips, connectors, test jacks and other test points. Photographs and/or drawings of actual equipment, and wooden or plastic outlines or dummies of various devices such as transformers, coils, etc., may be used both to add realism and to assist the trainee in properly locating various test points. The test points, terminals and socket pins available in the actual equipment, or electrically-conducting facsimiles thereof are included in the apparatus and connected to selectively control the generation of various quantities generated in the universal signal generator.

An important feature of my invention, and one which allows economical construction of an acceptable signal generator, is the arrangement provided wherein only one, or only a few, output signals need be generated at any one time by the signal generator. By providing one or more dummy test probes simulating the probes or input leads of electrical indicators or test instruments, such as volmeters and oscilloscopes, and by having the dummy test probes actually identify to the signal generator which test point is being tested, the signal generator is enabled always to generate the required proper simulated electrical quantities needed to operate one or more test instrument indicators without requiring the extensive apparatus which otherwise would be needed to generate all test point signals simultaneously. The dummy test probes and simulated test points may be used to operate as a selector switch to control the signal generator in accordance with which test point the probe is momentarily engaging. The signal generator then selectively applies the proper simulated electrical quantity to a test instrument or indicator.

For a fuller understanding of the nature and objects of the invention reference should be had to the following detailed description taken in connection with the accompanying drawings, in which:

FIG. 1 is a perspective view of a simplified early embodiment of the invention, showing an arrangement which may be constructed in accordance with the present invention to provide maintenance training on a simple electronic unit such as an amplifier;

FIG. 2 illustrates a simplified pattern-controlled selective switching means shown as comprising a simple punch card reader;

FIG. 3 is an electrical schematic diagram illustrating the nature of electrical connections between the dummy electronic unit, the signal generating unit including the pattern-controlled switch, and the dummy test probe in one form of the invention;

Figure 8:
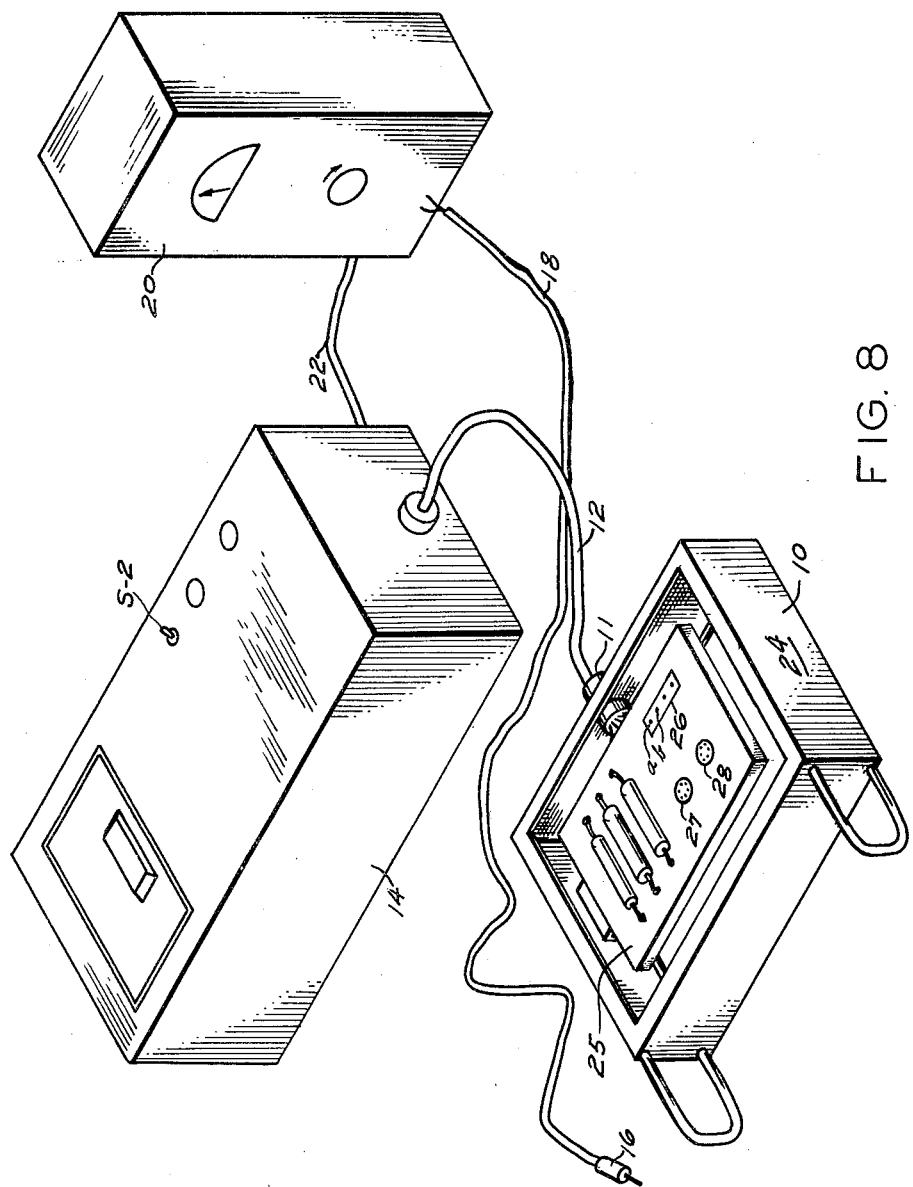
FIG. 8 shows a modified form of the apparatus of FIG. 1 in which connections between the test probe and signal generator unit are routed via the electrical indicator unit for added realism.

In FIG. 1 a dummy amplifier unit 10, which simulates in physical appearance an actual plug-in analog computer operational amplifier, is connected by means of connector 11 and cable 12 to signal generator apparatus 14. A dummy voltmeter test probe 16 and an actual voltmeter 20 are connected by means of cables 18 and 22 to signal generator unit 14. In some embodiments of the invention it will be regarded as preferable to route the conductors from dummy probes to the signal generator unit via the test instruments to which they are pretended to convey input signals. For example, as shown in FIG. 8, dummy voltmeter probe 16 might be connected to signal generator 14 by routing cable 18 to voltmeter 20 and then through the voltmeter housing to signal generator 14. In less expensive arrangements the cables may be routed as shown in FIG. 1, so that an ordinary voltmeter or multimeter may be used without modification.

Dummy amplifier 10 is shown provided with a wooden or plastic frame 24 which may be painted with aluminum paint or another metal paint to simulate a metal frame.

A plastic or cardboard insert 25 mounted in frame 24 carries a decalcomania simulation of the printed circuit of an actual amplifier. Terminal board 26 is provided with a plurality of terminals 26a, 26b, etc., corresponding to those of an actual amplifier, and dummy tube sockets 27 and 28 each are provided with a plurality of pin terminals simulating those of the actual amplifier tube (or transistor) sockets. A conductor is provided in cable 12 for each of the test points provided in dummy amplifier unit 10, and together with other conductors to be mentioned, these conductors lead to signal generator 14. Dummy probe 16 is electrically connected via cable 18, usually a single conductor cable, to signal generator 14, sometimes via the housing of a test instrument, as mentioned above. If the student touches probe 16 to any test point on dummy amplifier 10, a particular relay inside signal generator unit 14 will be energized to identify which test point the student is taking his measurement from. Operation of the particular relay establishes the proper circuit connections within unit 14 to apply the simulated electrical quantity to test instrument 20 which would be proper in view of the particular fault or malfunction being selected. Dummy amplifier unit 10 also may be provided with switches and variable resistances simulating any adjustable electrical devices of the actual unit, and wires from such devices are included in cable 12 together with the conductors leading from dummy test points.

Figure 4:
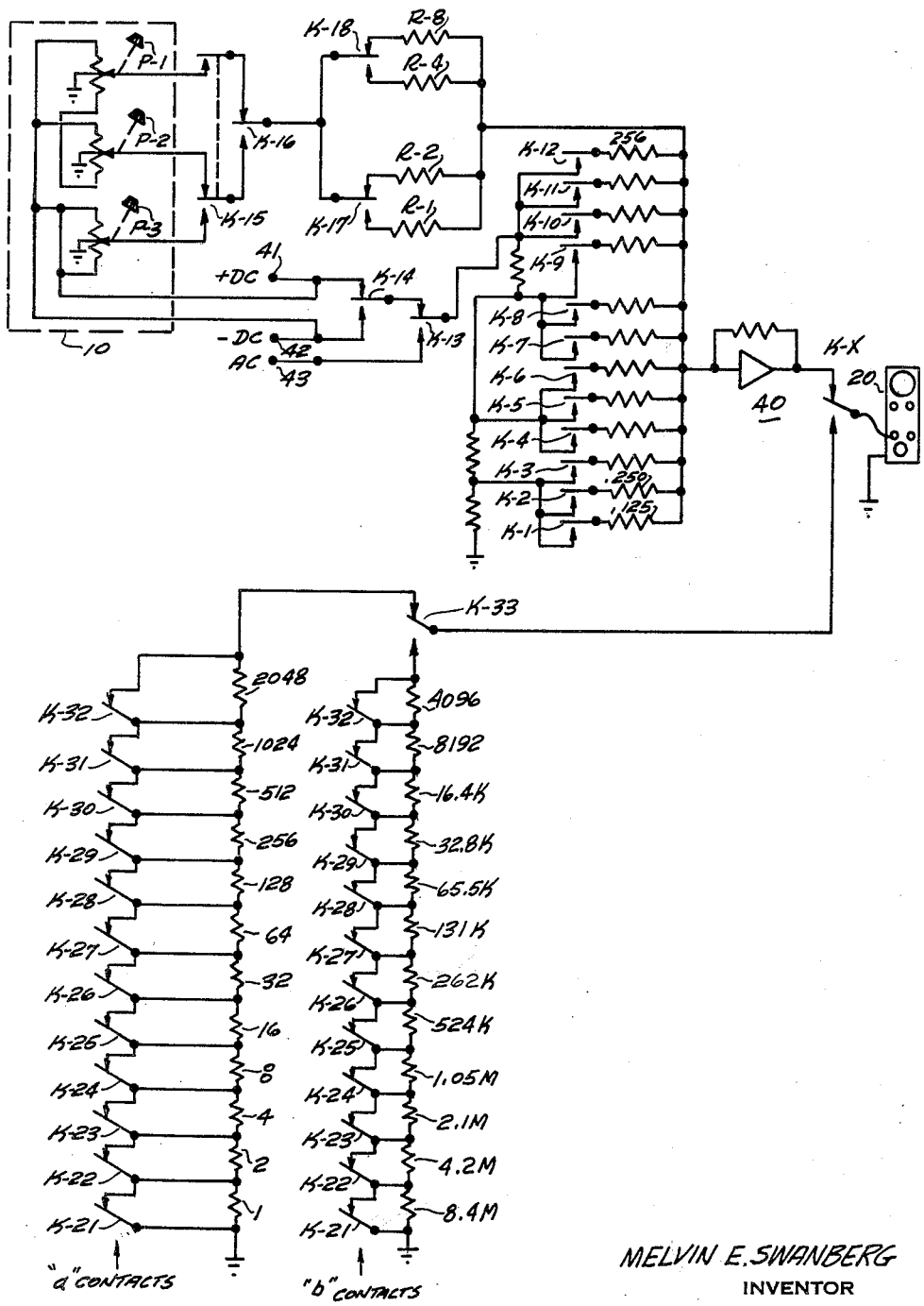
FIG. 4 is an electrical schematic diagram of exemplary voltage-generating and resistance-generating circuits which may form part of the signal generator unit.

An exemplary programming arrangement is illustrated by FIGS. 2, 3, and 4. FIG. 2 illustrates an elementary form of punch card reader in which punched cards, such as the well-known Hollerith cards, are inserted to set up different malfunction situations. It will be recognized that a set of punched card operated switches, or "card reader" is really only a programmed or pattern-controlled switching means. In FIG. 2 back board 34 and front board 35 are carried on hinge 36. Back board 34, which is constructed of insulating material, such as fiber or Micarta, carries a large plurality of spring contacts each having a metallic plunger which is resiliently biased to be urged toward front board 35. The spring contacts are arranged in a plurality of horizontal rows and vertical columns, in conventional manner, and a permanent circuit connection is made to each spring contact on the backside (not shown) of board 34. Front board 35 contains a corresponding large plurality of female front contacts arranged in cooperating rows and columns. With no card inside, closure of the front and back boards together results in electrical contact between each switch plunger and a respective mating female front contact. If a punched card 37 is installed between the boards, electrical contact will result only at those sets of contacts which are aligned with a hole in the punched card. Various other types of programmed switching means may be employed without departing from the invention. FIG. 3 shows one manner in which the punch card reader may be connected to operate relays. The back contacts of the reader, each of which are fastened in insulation board 34, connect in separate horizontal rows to different test points on the dummy amplifier unit, while the front contacts, each of which are carried in front plug board 35, all connect in separate vertical columnar groups to respective relays, so that a matrix or "cross-bar" switch is interposed between the plural test point inputs and the relay group shown in FIG. 3. For convenience only three of the input lines from the test points are shown. By provision of an appropriately located hole in a punched card, any input line in FIG. 3 may be connected to operate any relay in FIG. 3. Diodes may be provided as shown to eliminate sneak circuits, in well-known manner. In FIG. 3 relays K–1 through K–12 are used to select the appropriate voltage amplitude, and relays K–13 and K–14 are used to determine whether an A.C. or D.C. voltage is selected. Relays K–15 and K–16 select one of three potentiometers located on the dummy amplifier unit if the voltage at the monitored test point is to be adjustable, and relays K–17 and K–18 select one of four possible slopes or adjustment ranges for the potentiometers. The contacts operated by the relay coils of FIG. 3 are indicated by corresponding designations in FIG. 4.

In FIG. 4, by means of a binary-coded relay system, a resistance network and a summing circuit, voltages are selected and added to synthesize the desired output voltage. Each relay of the K–1 through K–12 group selects a voltage which is exactly twice that of its adjacent lower order relay. For example, relay K–1 closure provides a .125 volt output, relay K–2 closure provides a .250 volt output, etc., so that 12 relays can generate any voltage between zero and 512 volts in ⅛ volt steps. To generate 28.25 volts relays K–2, K–6, K–7 and K–8 would be closed, resulting in a summation of .25, 4, 8 and 16 volts. Thus punching holes in the card in columns 2, 6, 7 and 8 in the same row would provide 28.25 volts output to the test point connected to operate the row whenever the dummy test probe were applied to the particular test point. Relay K–13 is programmed in a similar manner to determine whether alternating or direct voltage should be produced, and if D.C. is selected relay K–14 determines its polarity.

Relays K–15 and K–16 selected one of a plurality (three are shown) of potentiometer outputs (from P–1, P–2 or P–3) which are located on the dummy amplifier unit 10 so that proper simulation of amplifier output during the selected malfunction will be had while controls on the dummy amplifier are adjusted. The selected potentiometer voltage is added, through one or more of four summing resistors R–1, R–2, R–4 and R–8, to the voltage established by the relays K–1 to K–12 arrangement described above. Relays K–17 and K–18 select various desired slopes or ranges of adjustment for the potentiometer selected, so that each potentiometer can have different effects on different test point voltages. For sake of economy the potentiometers used on dummy amplifier unit 10 may be of considerably higher resistance, lower voltage and lower accuracy than potentiometers used in actual amplifier units.

In FIG. 4 the various voltages required to be supplied to the test instrument are shown as being synthesized by combining voltages according to a binary code. It is quite within the scope of my invention, however, to utilize merely a voltage divider having a large plurality of taps, and to switch single desired output voltages therefrom. The advantage of the combining system shown is that it allows accurate synthesis in very small steps over a large range without requiring a very long voltage divider having a great many taps. The summing means is shown as comprising an ordnary analog computer direct-coupled parallel-addition summing amplifier 40, but various equivalent devices may be substituted.

A manual switch S–2 on the signal generator unit is operable by the trainee or instructor between "On" and "Off" or "Voltage" and "Resistance" measurement conditions. In the "On" or "Voltage" position, relay K–X is de-energized, and any synthetic voltage output from the signal generator is applied to conventional voltmeter 20. In the "Off" or "Resistance" position, relay K–X disconnects the voltage-synthesizing circuit from the test instrument and substitutes a resistance-synthesizing circuit shown as comprising a chain of series-connected resistances selectively switched by contacts of relays K–21 through K–32.

The resistances are shown as being connected in a binary string, with exemplary resistance values shown. By pure binary coding, any resistance value between zero and 4095 may be provided by the left-hand branch of the network shown, in one ohm steps, by appropriate selection of relays K–21 to K–32. If greater resistances are required, operation of relay K–33 may be provided to insert a group of binary-related high resistances in the right-hand branch of the network shown. The left-hand "low scale" resistances are controlled by the "a" contacts of relays K-21 to K-32, while the high resistances are controlled by the "b" contacts of the same relays.

As well as those embodiments of the invention which accommodate and use standard unmodified test instruments, the invention also includes alternative versions utilizing modified or simulated test instruments, which in certain instances may be provided at much lower cost. Certain connections or modifications may be incorporated in these alternative versions of the invention for purposes to be described.

Systems using modified test instruments have the advantage that meters may be operated with little or no multiplier resistance and arbitrary dial calibrations, so that only low D.C. voltages need be developed by the signal generator and applied to the simulated instrument terminals. Ordinary d'Arsonval movements may be calibrated in terms of direct or alternating voltage or current, power, resistance, frequency, noise, and a variety of other parameters. A simulated radio frequency power meter, for example, having a maximum scale reading of many kilowatts, can be operated in reality by low voltage D.C., eliminating numerous insulation, transmission, coupling and similar problems, with a great savings in cost and with much greater safety for inexperienced personnel.

Figure 5:
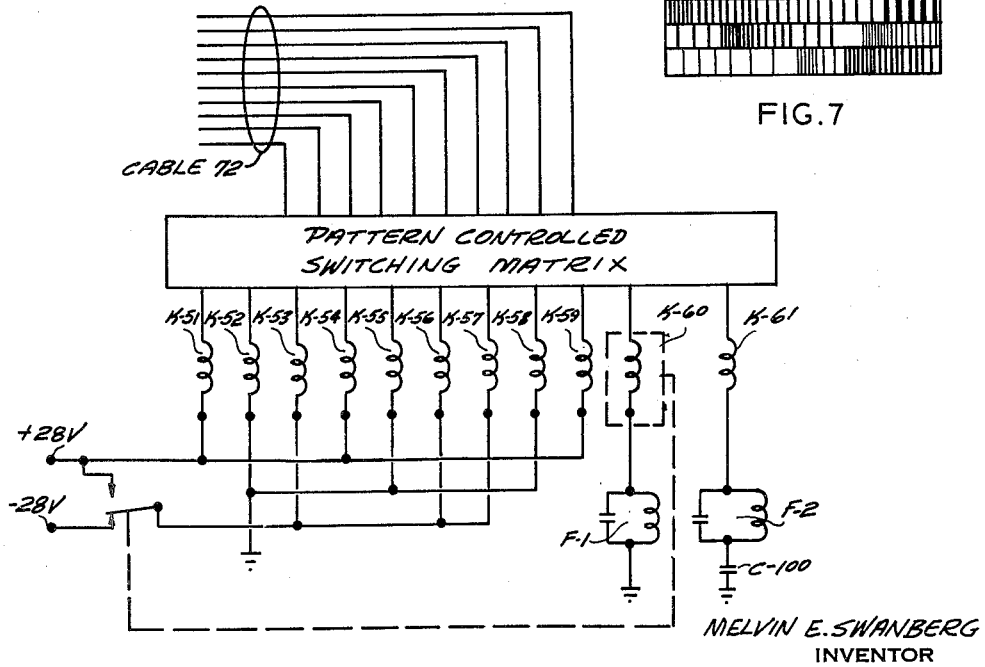
FIG. 5 is an electrical schematic diagram, partially in block form, illustrating a modified arrangement designed to be used with plural dummy test probes carrying different electrical signals, so that relay operation within the signal generator unit is accomplished selectively in accordance with use of different dummy test probes.

In a number of trouble shooting procedures it is desirable to take more than one meter reading at a time, and the invention may be constructed to provide signals, either actual or simulated, to operate simultaneously, a plurality of test instruments, either real or simulated. For example, additional contacts may be provided on the relays shown and on further relays to connect simultaneously further synthetic electrical quantities to further actual or simulated test instruments, through plural input leads connected to the test instruments. In some cases if plural actual or simulated test instruments are to be operated, it may be necessary, in the interest of realism, simultaneously to connect two or more dummy test probes to two or more test points. In such cases it is necessary to distinguish between the test probes to properly operate the signal generator apparatus selectively, and such operation may be provided simply and economically in the present invention merely by connecting distinctive or unique signals to different dummy test probes. For example, various relays may be connected to ground, certain other relays connected to a positive direct voltage, certain further relays connected to a negative direct voltage and other relays connected through frequency selective filters, so that they may be actuated solely by particular dummy probes. In FIG. 5 it will be seen that the bottom terminals of relays K-51, K-54 and K-59 are connected to positive D.C. voltage. If a dummy test probe having ground potential, or negative direct potential is applied to one of the test points to which lines of cable 72 are connected, these three relays may be actuated, but if a 28 v. positive D.C. potential or an A.C. potential is applied by the dummy test probe, the relays will remain unoperated. Relays K-53, K-56 and K-57 are shown connected to a negative D.C. potential, so that they will be actuated upon receipt of a ground or positive potential, but not by an A.C. or a negative potential. If desired, relays connected in parallel may be provided with different "pull-in" voltages, so that the amplitude of a dummy test probe also can determine relay operation and selectively switch the internal signal generator connections. In some embodiments of the invention it may be desirable to provide A.C. superimposed on D.C. so that a given probe will actuate both A.C. and D.C. relays. Relays K-52, K-55 and K-58 can be actuated by either positive or negative potentials but not ground potentials. Relay K-60 has a frequency selective filter means F-1 connected in series therewith, so that an applied A.C. voltage of the filter anti-resonant frequency will not operate relay K-60, but so that D.C. or a different frequency A.C. signal will operate the relay. Relay K-61 is similarly connected, except that capacitor C-100 prevents D.C. from operating the relay. It thus will be seen that differently connected dummy test probes may be arranged to operate relays selectively so as to provide different signals properly related to plural actual or simulated test instruments. It should be further noted that various selective relays may be connected to control and alter the operation of various other relays. For example, operation of relay K-60 is shown as reversing the connections of relays K-53, K-56 and K-57 from a negative return to a positive return, thereby considerably changing the operating schedule of these three relays. FIG. 5 merely illustrates a few of the many techniques which may be used to selectively switch the internal connections of the signal generator unit in response to contact of different dummy test probes with different test points, so as to provide appropriate signals from the signal generator unit to the appropriate actual or dummy test instrument.

Figure 6:
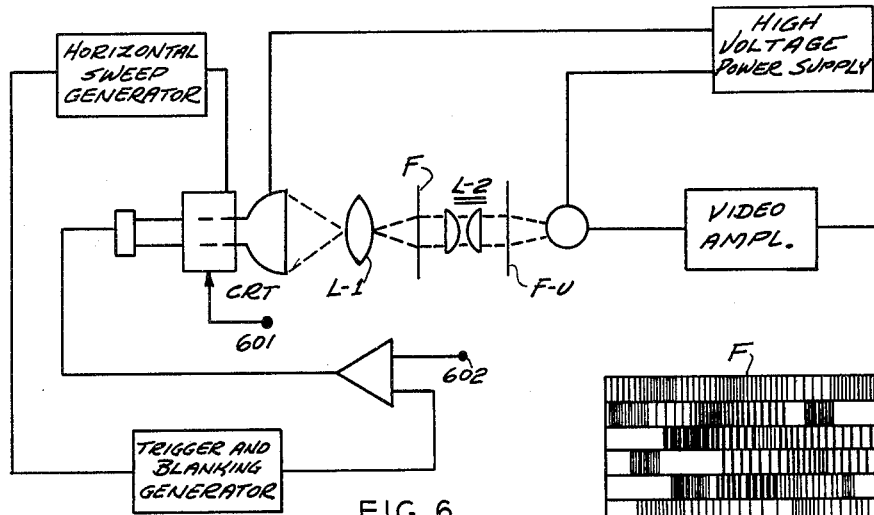
FIG. 6 is a block and schematic diagram illustrating an electrical waveform generator which may be used in connection with the present invention.
Figure 7:
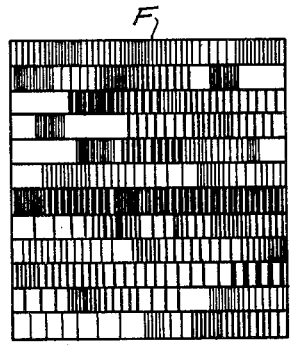
FIG. 7 shows an exemplary transparency of varying density constructed for use with the apparatus of FIG. 6.

In addition to voltage and resistance electrical quantities, periodic waveforms of many types can be generated in the signal generator unit and applied to appropriate test instrument indicators, such as oscilloscopes. In FIG. 6 there is shown a flying spot film scanner device especially designed for use in the present invention. A record consisting of a transparent film F (better shown in FIG. 7) contains waveform information in the form of areas of varying density. A plurality of separate strip areas have differently varying grayness, so that the spot of light on the face of cathode ray tube CRT provides differently-modulated beams of light when projected through focusing lens L-1, collimating lens system L-2, and ultraviolet filter F-U, thereby providing different electrical waveforms as different strips are scanned. These voltages are amplified and applied as required to actuate actual oscilloscope test instruments (not shown). The selection of which waveform strip is scanned is controlled by the vertical deflection signal on terminal 601 and the vertical deflection system of the cathode ray tube. Waveform amplitude may be controlled by controlling the intensity of the scanner spot, by voltage control of the CRT grid-cathode voltage through control of the potential at terminal 602. Programming of the vertical deflection voltage and the scanning spot intensity may be effected in diverse ways, such as by the voltage generating means shown above, as they merely require the generation of D.C. voltages.

In addition to the special waveform generator of FIG. 6, the signal generator unit may incorporate various simple circuits whose output signals are selectively switched, including noise generators, oscillators, modulators, gates, multi-vibrators, sawtooth generators and a variety of other well-known circuits, all connected to be selectively switched in accordance with contact between one or more dummy test probes and one or more dummy test points to provide realistic signals to either actual or simulated test instruments.

In some embodiments of the invention the signal generator unit may be physically located inside the dummy unit. For example, mock-ups of large electronics cabinets and racks, such as those used for some large transmitters, computers and radar sets, may include inside their housings signal generator units constructed according to the present invention.

It is desirable in connection with the troubleshooting of certain electronic apparatus that certain measurements be made in particular sequences, perhaps with certain equipment adjustments required between some measurements, and further apparatus adapted for use with the present invention will be very useful for teaching such procedures. Since the dummy test probes of the present invention apply an electrical signal to any test point which they contact, the sequence of test point contacts may be monitored by a signal-sensing system, and indications of "right" and "wrong" sequences may be made. It also is desirable in connection with the teaching of proper servicing of some equipment to encourage fewer test "readings" and greater analysis, and the invention also may incorporate scoring means adapted to such a purpose. In some embodiments of the invention, in order to encourage careful analysis and proper care of test gear, it may be desirable to indicate grossly improper procedures by means of an alarm or other indication, or alternatively, by a simulated "failure" of an actual or simulated test instrument being used. For example, if the dummy probe of a low-range voltmeter test instrument is touched by the student to a test point which would, in the actual apparatus, be carrying a high voltage, a relay sensing such contact may operate an alarm or may disconnect the low-range voltmeter and hold it disconnected.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Apparatus for training one or more trainees in proper fault and malfunction detection and location procedures for maintenance of an electrical machine, comprising in combination: a dummy electrical machine having an appearance simulating that of an actual electrical machine and provided with a plurality of simulated test points corresponding to those of said actual electrical machine; a signal generator unit having pattern-controlled switching means settable in accordance with simulation of a selected mode of operation for providing a selected output electrical quantity; an electrical indicator connected to said signal generator unit to receive said selected output electrical quantity and to provide an output indication; and a test conductor connection means electrically connected to said signal generator unit and operable when connected to a selected one of said simulated test points to apply an electrical signal different from the electrical signal present at the corresponding test point of said actual electrical machine during said desired mode of operation of said actual electrical machine, said different electrical signal being connected by said test conductor connection means to control said signal generator unit, thereby to provide said selected output electrical quantity from said signal generator unit in accordance with the contact of said test conductor connection means to said selected simulated test point, said electrical indicator being calibrated with respect to said selected output electrical quantity so as to provide an output indication in accordance with the output indication an indicator would have if it were connected to said corresponding test point of said actual electrical machine during said selected mode of operation.

2. Apparatus for training one or more trainees to trouble shoot electrical machinery, comprising in combination: a mock-up of an electrical machine having an appearance simulating that of an actual electrical machine and a plurality of test points corresponding to electrical terminals used in testing of said actual electrical machine; a signal generator means for providing a selected output electrical quantity; an electrical indicator electrically connected to be operated by said selected output electrical quantity to provide an indication for observation by said one or more trainees; and a test conductor connection means electrically connected to said signal generator means, said test conductor connection means being adapted to be connected individually to each of said test points, and operable when connected to a selected one of said simulated test points to apply an electrical potential to said selected one of said test points, the same potential being applied from the test conductor connection means irrespective of which test point the test conductor connection means may be connected to, each of said test points being connected to said signal generator unit to control a characteristic of said selected output electrical quantity and thereby control the output indication on said electrical indicator.

3. Apparatus according to claim 2 in which said signal generator means is housed separately from said mock-up and in which said plurality of test points are connected to said signal generator means by at least one cable.

4. Apparatus according to claim 2 in which said signal generator means is contained at least partially inside said mock-up.

5. Apparatus for training one or more trainees to trouble shoot electrical machinery, comprising in combination: a mock-up of an electrical machine having an appearance simulating that of an actual electrical machine and a plurality of test points corresponding to electrical terminals used in maintenance of said actual electrical machine; a signal generator unit for providing a selected output electrical quantity; an electrical indicator electrically connected to be operated by said selected output electrical quantity to provide an indication for observation by said one or more trainees; and a test conductor connection means electrically connected to said signal generator unit and operable when applied to touch a selected one of said simulated test points to apply an electrical signal to control a characteristic of said selected output electrical quantity, said plurality of test points being connected via respective input lines to control selective switching means within said signal generator unit.

6. Apparatus according to claim 5 in which said signal generator unit includes means for scanning a record to provide a desired waveform for said selected output electrical quantity.

7. Apparatus according to claim 5 in which said selective switching means of said signal generator includes first switching means connected to a first respective input line to be operated by said electrical potential, and second switching means connected to a second respective input line and to said first switching means, whereby operation of said first switching means controls the response of said second switching means to a signal on said second respective input line.

8. Apparatus for training one or more trainees to trouble shoot electrical machinery, comprising in combination: a mock-up of an electrical machine having an appearance simulating that of an actual electrical machine and a plurality of test points corresponding to electrical terminals used in maintenance of said actual electrical machine; a signal generator unit for providing a selected output electrical quantity; an electrical indicator electrically connected to be operated by said selected output electrical quantity to provide an indication for observation by said one or more trainees; and a test conductor connection means electrically connected to said signal generator unit and operable when applied to touch a selected one of said simulated test points to apply an electrical signal to control a characteristic of said selected output electrical quantity, said signal generator unit including pattern-controlled switching means operative to control a characteristic of the selected output electrical quantity.

9. Apparatus according to claim 8 in which said pattern-controlled switching means is connected to control a plurality of relays.

10. Apparatus according to claim 9 in which said pattern-controlled switching means comprises a matrix switching means in which appropriately-fashioned patterns are capable of connecting any one of a group of input signals to any one of a group of relays.

11. Apparatus according to claim 10 in which said pattern-controlled switching means comprises a punched card reader.

12. Apparatus according to claim 9 in which certain of said relays are connected to respond to said electrical potential and others of said relays are unresponsive to said electrical potential.

13. Apparatus according to claim 2 in which said test conductor connection means is electrically connected to said signal generator via cable means connected between said test conductor connection means and a housing in which said electrical indicator is located.

14. Apparatus for use in administering training in fault and malfunction location procedures for maintenance or repair of an electronic assembly, comprising in combination: a dummy electronic machine having an appearance simulating that of said electronic assembly, said dummy machine being provided with a plurality of simulated test points corresponding to those of said electronic assembly; a dummy test conductor connection means simulating the test conductor connection means or input lead of an electronic indicator instrument; an electrical source of voltage connected to said dummy test conductor connection means; a plurality of relays; circuit means including pattern-controlled switching means for connecting said simulated test points selectively to said plurality of relays in accordance with conditions of a particular electronic assembly malfunction, whereby touching said dummy test conductor connection means to one of said simulated test points serves to apply said voltage to operate at least one of said relays; an electronic indicator simulating a test indicator with which said dummy test conductor connection means is associated; and electrical quantity generating means controlled by said relays and operable to present to said electronic indicator an electrical quantity simulating the electrical quantity which would be applied to a similar test instrument by said electronic assembly under the operating conditions being simulated.

15. Apparatus according to claim 14 in which said dummy electronic machine is provided with a variable electrical device simulating a similar device on said electronic assembly, said variable electrical device being connected to said electrical quantity generating means so as to provide realistic variation of said electrical quantity as said variable electrical device is varied.

16. Apparatus according to claim 14 having a second dummy test conductor connection means, a second electronic indicator instrument, and a second source of voltage, selective connection of said second dummy test probe to one of said simulated test points serving to apply said second source of voltage to said test point, at least one characteristic of the voltages from said two different sources differing, so that said voltages operate said relays selectively.

17. Apparatus according to claim 16 in which said voltages from said two different sources differ in frequency, and in which filter means are connected to one of said relays.

18. Apparatus according to claim 16 in which said voltages from said two different sources differ in polarity with respect to a reference level, and in which two of said plurality of relays are connected to two terminals having different polarity potentials with respect to said reference level.

References Cited in the file of this patent

UNITED STATES PATENTS

| | | |
|---|---|---|
| 2,470,434 | Eckman et al. | May 17, 1949 |
| 2,592,552 | Florez et al. | Apr. 15, 1952 |
| 2,664,665 | Rozenoff | Jan. 5, 1954 |
| 2,712,184 | Ziebolz et al. | July 5, 1955 |
| 2,815,484 | Bulliet et al. | Dec. 3, 1957 |
| 2,826,628 | Kruse | Mar. 11, 1958 |
| 2,859,540 | Himpele | Nov. 11, 1958 |
| 2,882,618 | Thompson | Apr. 21, 1959 |

FOREIGN PATENTS

| | | |
|---|---|---|
| 593,617 | Canada | Mar. 1, 1960 |